United States Patent [19]
Reynolds et al.

[11] Patent Number: 5,719,678
[45] Date of Patent: Feb. 17, 1998

[54] VOLUMETRIC MEASUREMENT OF A PARCEL USING A CCD LINE SCANNER AND HEIGHT SENSOR

[75] Inventors: Andrew E. Reynolds, Bothell; William M. McDonald, Lake Stevens; Gregory J. Newberry, Lynnwood, all of Wash.

[73] Assignee: Intermec Corporation, Everett, Wash.

[21] Appl. No.: 565,639

[22] Filed: Nov. 29, 1995

Related U.S. Application Data

[63] Continuation of Ser. No. 280,721, Jul. 26, 1994, abandoned.

[51] Int. Cl.⁶ .......................... G01B 11/28; G01B 11/02; G01B 11/10
[52] U.S. Cl. .......................... 356/379; 356/383; 356/384; 356/385; 356/386; 364/564; 235/383; 382/101
[58] Field of Search ........................ 356/379–380, 356/383–384, 385, 386; 364/564, 562; 33/1 Y; 348/86, 89, 91, 135, 142; 382/141, 143, 100–102; 235/383

[56] References Cited

U.S. PATENT DOCUMENTS

| | | | |
|---|---|---|---|
| 3,436,968 | 4/1969 | Unger et al. | 364/564 |
| 3,588,480 | 6/1971 | Unger et al. | 364/564 |
| 4,905,512 | 3/1990 | Hayashi | 364/564 |
| 4,963,035 | 10/1990 | McCarthy et al. | 348/91 |
| 5,042,015 | 8/1991 | Stringer | 364/564 |
| 5,105,392 | 4/1992 | Stryer et al. | 364/564 |
| 5,142,160 | 8/1992 | Storbeck | 356/379 |
| 5,164,995 | 11/1992 | Brooks et al. | 356/383 |
| 5,184,733 | 2/1993 | Arnarson et al. | 348/91 |
| 5,253,765 | 10/1993 | Moorehead | 348/91 |
| 5,311,999 | 5/1994 | Malow et al. | 348/91 |
| 5,325,178 | 6/1994 | Louis et al. | 356/383 |
| 5,331,118 | 7/1994 | Jensen | 364/564 |
| 5,422,861 | 6/1995 | Stringer et al. | 364/564 |
| 5,468,945 | 11/1995 | Huggett et al. | 235/462 |
| 5,581,628 | 12/1996 | Nakamura et al. | 382/101 |

FOREIGN PATENT DOCUMENTS

| | | |
|---|---|---|
| 59-174722 | 11/1984 | Japan. |
| 60-133309 | 7/1985 | Japan. |

OTHER PUBLICATIONS

U.P.C. Symbol Specification Manual, Uniform Code Council, Inc., Dayton, Ohio, 1986.

*Primary Examiner*—Frank G. Font
*Assistant Examiner*—Jason D. Vierra-Eisenberg
*Attorney, Agent, or Firm*—Seed and Berry LLP

[57] ABSTRACT

Apparatus is disclosed for automatically determining the volume of an object. The volume system includes a height sensor and a width sensor positioned in generally orthogonal relationship and each constructed to reflect light from a corresponding surface of the object. The height sensor and the width sensor each include a plurality of charge coupled devices for sensing light reflected from the object. The output from the height sensor and the width sensor are provided to a data processor for evaluating the data to determine a plurality of incremental volume of the object as the object is displayed in relation to the height and width sensors. The plurality of incremental volume are then added to determine the volume of the object.

19 Claims, 6 Drawing Sheets

1

VOLUMETRIC MEASUREMENT OF A PARCEL USING A CCD LINE SCANNER AND HEIGHT SENSOR

CROSS-REFERENCE TO RELATED APPLICATION

This application is a continuation of U.S. patent application Ser. No. 08/280,721, filed Jul. 26, 1994, now abandoned.

TECHNICAL FIELD

The present invention relates to automated parcel handling apparatus, and, more particularly, to apparatus for determining the volume of an object.

BACKGROUND OF THE INVENTION

Recently, systems and procedures for automated parcel handling have developed rapidly. Particularly, devices for automatic identification of parcels, e.g., barcoding systems and devices, have become commonplace. Also, devices for automatically determining the size and shape of parcels have been developed.

Prior art devices for automatically determining the size and shape of parcels rely upon a light beam directed toward one side of the parcel so that light perceived from the opposite side of the parcel indicates the perimeter of the parcel. By directing two light beams at two surfaces of the parcel, which surfaces are on generally orthogonal sides, the volume of the parcel can be detected. However, these prior art devices suffer from several disadvantages.

One disadvantage of these prior art devices is that they require an optical path around the parcel in two orthogonal directions. Typically, these devices are constructed for use to determine the volume of a parcel moving along a conveyor. A first optical transmitter/receiver pair is positioned along the side of a conveyor to determine the perimeter of the parcel as viewed from the side. A second optical transmitter/receiver pair is positioned on the top and bottom of the conveyor to view the perimeter from the top of the conveyor. These systems require openings in the conveyor to permit the transmitted light to pass through the conveyor to the optical receiver. Furthermore, complex methods are required for interpreting the signals received by the top and bottom optical transmitter/receiver pair to ensure that the integrity of the measurement is not impaired by a portion of the conveyor supporting the parcel.

Another drawback of the prior art systems is that they are unable to provide information concerning the parcel, other than the volume of the parcel. Accordingly, it is desirable to provide an automated parcel handling system capable of determining the volume of a parcel without requiring openings in a conveyor supporting the parcel. It is further desirable to provide an automated parcel handling system capable of obtaining information concerning the parcel in addition to the volume of the parcel.

SUMMARY OF THE INVENTION

The present invention is a parcel handling system for determining the volume of an object. The parcel handling system includes first and second sensor assemblies for providing respective first and second profile data indicative of the profile of the object as viewed from first and second directions. The system also includes a data processing assembly, responsive to the first and second profile data, for determining the volume of the object.

In a particularly useful embodiment of the invention, the first sensor assembly comprises a light sensing device for providing the first data profile, the light sensing device being constructed to receive at least a portion of light reflected from the object. The light sensing device is responsive to a sample signal to provide a measurement data signal indicative of the magnitude of light reflected from a field of view, wherein the field of view is a line displaced from the light sensing device in a view direction. A conveyor assembly is provided for moving the light sensing device relative to the object so that a plurality of portions of the object are positioned in the field of view. The light sensing device is further constructed to determine the magnitude of light radiating from the field of view as the light sensing device is displaced relative to the object thereby to provide the first profile data.

A method for determining the volume of an object includes the steps of reflecting light from the object in first and second generally orthogonal directions and receiving at least a portion of the light reflected. From the reflected light, respective first and second data signals are provided. The first data signals are filtered to distinguish light reflected from the object from other light received. As a result of the filtering, first filtered data signals are provided wherein the first filtered data signals are indicative of the light reflected from the object. The first filtered data signals are combined with the second data signals to provide the volume of the object.

DETAILED DESCRIPTION OF THE INVENTION

Figure 1A:
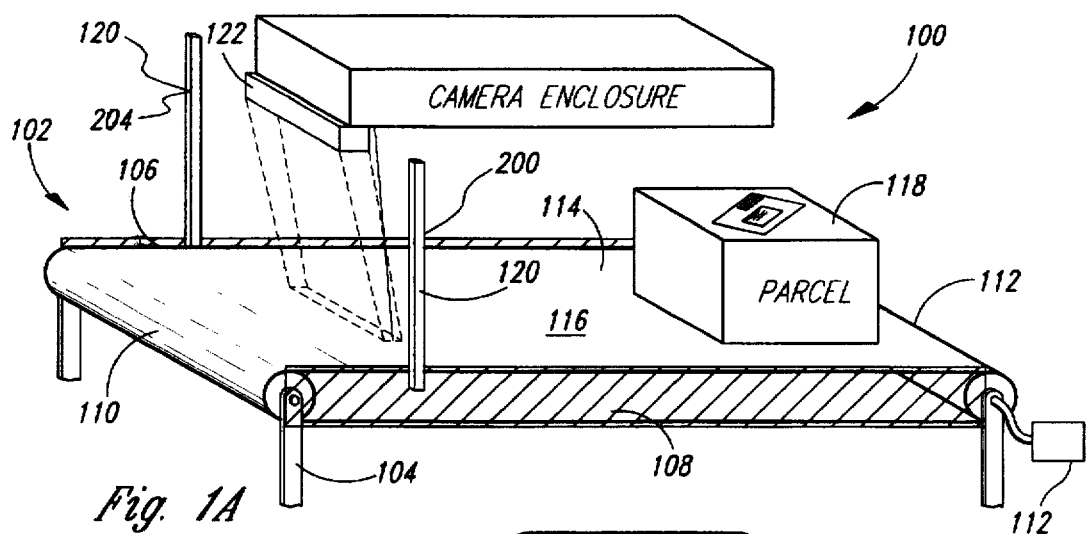
FIG. 1A is an illustration of the subject system for automatically determining the volume of a parcel.

A volume system 100 for automatically determining the volume of an object is illustrated in FIG. 1A. Therein, the volume system 100 includes a conveyor 102 having a conveyor frame 104 wherein the conveyor frame is an elongated substantially planar member having first and second edges 106 and 108. The first edge 106 is positioned opposite the second edge 108 and both are positioned intermediate first and second ends 110 and 112 of the conveyor.

A conveyor belt 114 is rotatably supported on the conveyor frame 104 and includes a top side 116 that is constructed for supporting an object 118. The conveyor 102 is provided for moving the object 118 from the first end 112 to the second end 110 thereof, as is known in the industry. Those skilled in the art will appreciate that although one portion of the conveyor 102 is illustrated in FIG. 1A, the conveyor may actually comprise a plurality of conveyor portions constructed to move the object 118 from a loading site to an unloading site where the conveyor 102 is driven by a motor 105, which is well known in the art.

In order to determine the volume of the object 118, the volume system 100 includes a height sensor 120 and a width sensor 122. The height sensor 120 is positioned along the first and second edges 106 and 108 of the conveyor 102 for determining the height profile of the object. As will be described in more detail below, the height sensor 120 includes a light source constructed to direct light toward the object 118 and a plurality of light sensing devices constructed to sense light transmitted past the object 118. The output from the height sensor 120 is provided to a data processor for determining the height profile of the object 118, as will be described in more detail below.

The width sensor 122 is displaced from the surface 116 of the conveyor 102 and positioned for determining the width profile of the object. Unlike the height sensor 120, the width sensor 22 is constructed to sense light that is reflected from the object 118. The width sensor 122 includes a light source that is positioned and constructed to reflect light from the object 118. The width sensor 122 also includes a plurality of light sensors that are positioned and constructed to receive at least a portion of the light reflected from the object 118. The output from the width sensor 122 is provided to the data processor, as will be described below, for determining the width profile of the object 118.

Figure 1B:
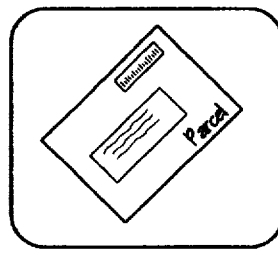
FIG. 1B is an illustration a two-dimensional upper surface of the parcel as imaged by the apparatus illustrated in FIG. 1A.

Advantageously, the width sensor 122 is constructed to determine the width and length profile of the object 118 by reflected light. As a result, in addition to determining the outline image of the parcel, the volume system 100 is able to reconstruct the entire image of the object 118, as will be described in more detail below. This is because the output from the width sensor 122 comprises image data that can be used to reconstruct a two-dimensional image, or the top image of the object 118 as illustrated in FIG. 1B. The two-dimensional image can include an image of a machine-readable symbol such as a bar code, as is shown in FIG. 1B. It should be apparent to those skilled in the art that although the height sensor 120 is described herein as being constructed to transmit light past the object 118 and detect the light transmitted past the object, that the height sensor 120 could be constructed like the width sensor 122 to detect light reflected from the side of the object 118.

Figure 2:
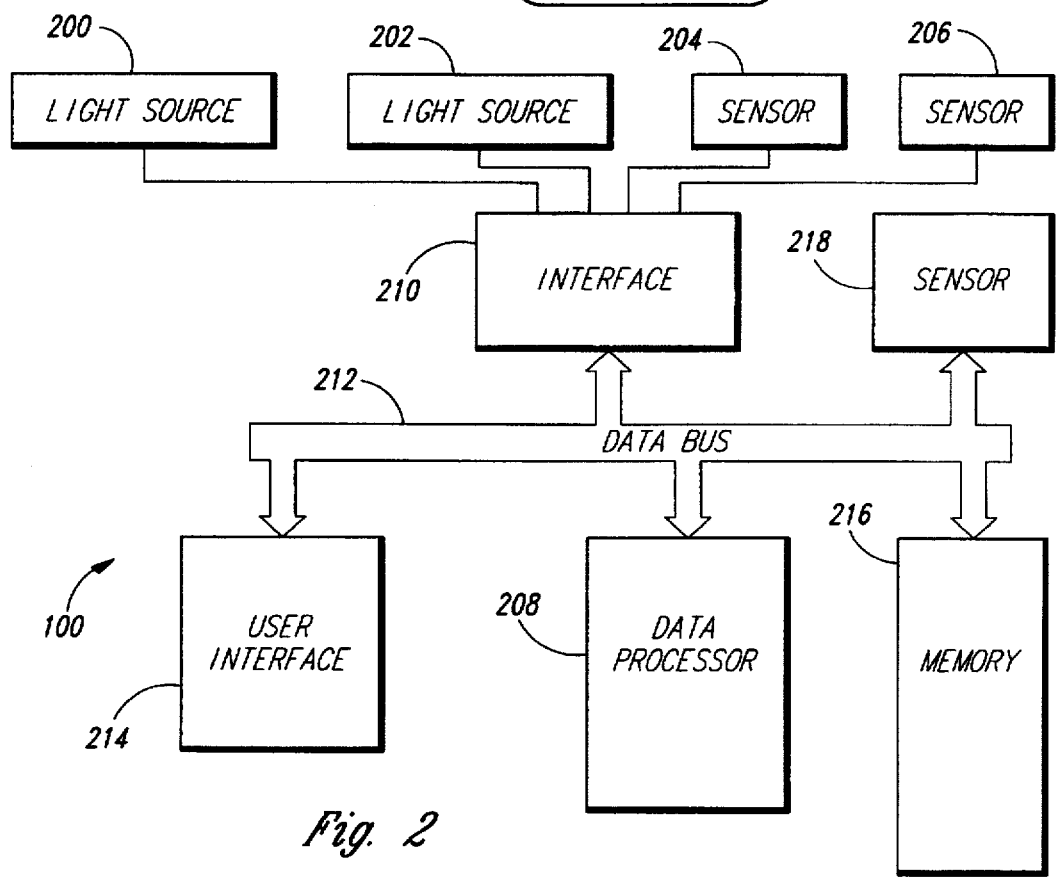
FIG. 2 is a schematic diagram illustrating the electronic circuit of the apparatus illustrated in FIG. 1.

A schematic diagram of the volume system 100 is provided in FIG. 2. Therein, first and second light sources 200 and 202 are illustrated and comprise the light sources of the height sensor 120 and width sensor 122. Similarly, first and second sensors 204 and 206 are illustrated and comprise the plurality of light sensors of the height sensor 120 and width sensor 122. It should be appreciated by those skilled in the art that although one sensor 204 and one sensor 206 is illustrated in FIG. 2, each sensor 204 and 206 actually comprises a plurality of light sensors each adapted to provide an output signal indicative of the magnitude of light sensed thereby. Light sensors suitable for use as the first and second sensors 204 and 206 may be any of a variety of devices typically referred to as charge coupled devices. Moreover, any conventional device for providing an output the magnitude of which varies with the intensity of light being detected may be used as the light sensors of the present invention.

The light sources 200 and 202 and the sensors 204 and 206 are coupled to a data processor 208 via an interface 210 and a data bus 212. The interface 210 may be readily provided by those skilled in the art and constructed from commonly available electronic components. The data bus 212 may construct a conventional data bus for exchanging information between the interface 210 and the data processor 208. The data processor 208 may comprise any conventional device, or plurality of devices, capable of performing the data processing functions described herein. As examples, the data processor 208 may comprise a microprocessor, a personal computer, a computer, or any plurality of electronic components constructed to perform digital data processing.

The data processor 208 is constructed to provide a sample signal to the light sources 200 and 202 and sensors 204 and 206 of the height sensor 120 and width sensor 122 via the interface 210. The sample signal is preferably provided at predetermined intervals so that a plurality of sample signals are provided as the object 118 moves past the height sensor 120 and the width sensor 122. The plurality of sensors 204 and 206 are each constructed to provide a measurement data signal in response to each sample signal. Accordingly, the plurality of charge coupled devices that make up the sensor 204 each provide a measurement data signal to the data processor 208 in response to each sample signal. Similarly, the plurality of charge coupled devices that make up the sensor 206 each provide a measurement data signal to the data processor 208 in response to the sample signal. The plurality of measurement data signals provided by each sensor 204 and 206, in response to each sample signal is referred to herein as image data. As will be described in more detail below, the data processor 208 is responsive to this image data for determining the surface images of the object 118 and for determining the volume of the object.

The volume system 100 further includes a user interface 214 that is provided for interfacing a user with the volume system 100. The user interface may comprise a keyboard, a display, and a printer for receiving user input and for providing information to the user. Also, the image system 100 includes memory 216 which may include read only memory (ROM) and random access memory (RAM). The memory 216 is provided for storing instructions and data for use by the data processor 208, as is known in the art.

The image system 100 also includes a motion sensor 218 for sensing the motion of the object 118 upon the conveyor 102. The motion sensor 218 provides motion signals to the data processor 208. In a presently preferred embodiment of the invention, the data processor 208 is responsive to the motion signals for providing the sample signal.

Figure 3A:
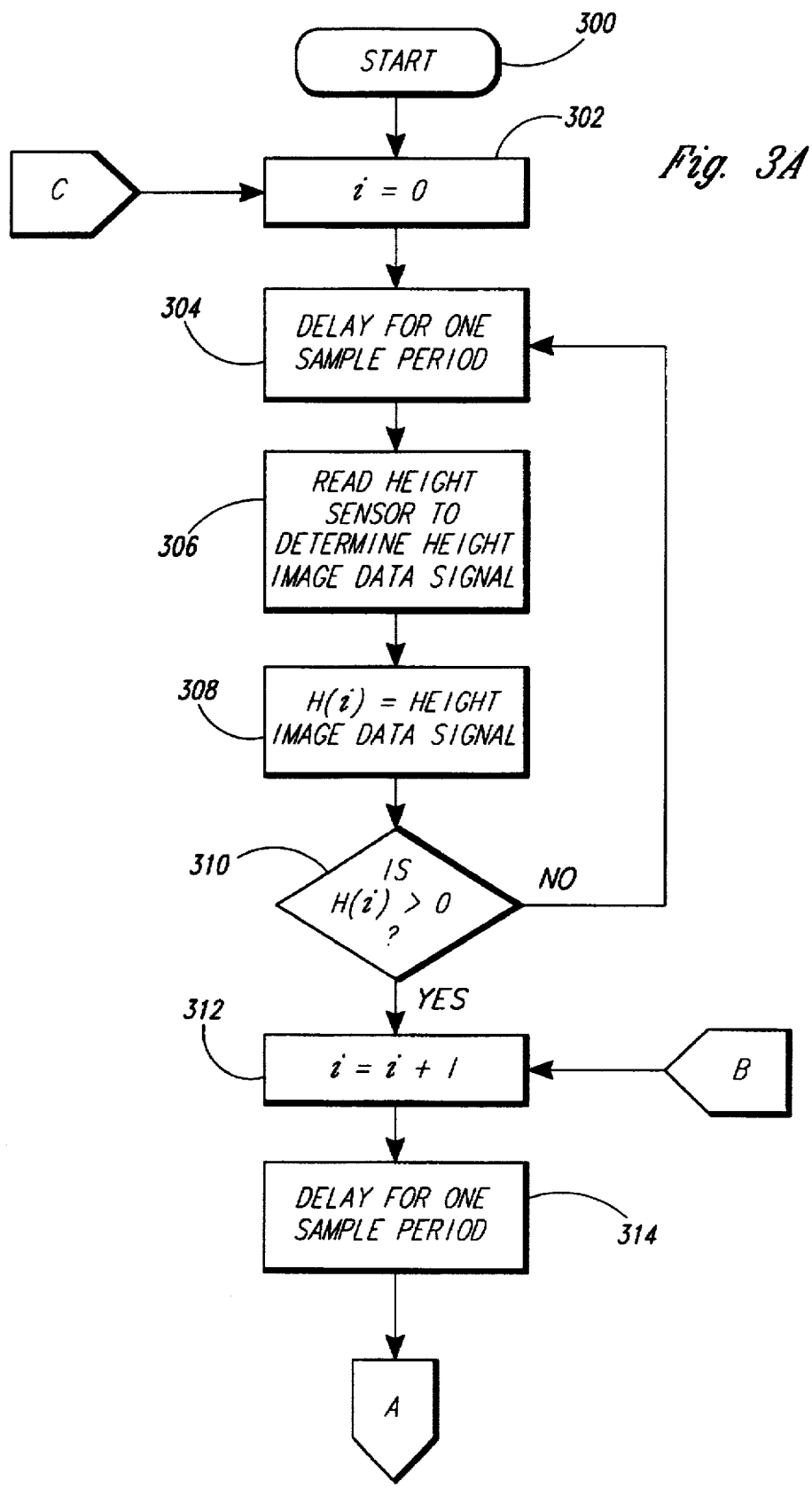
FIGS. 3A and 3B are decision flow diagrams illustrating the method for determining the height of an object in accordance with the subject invention.
Figure 3B:
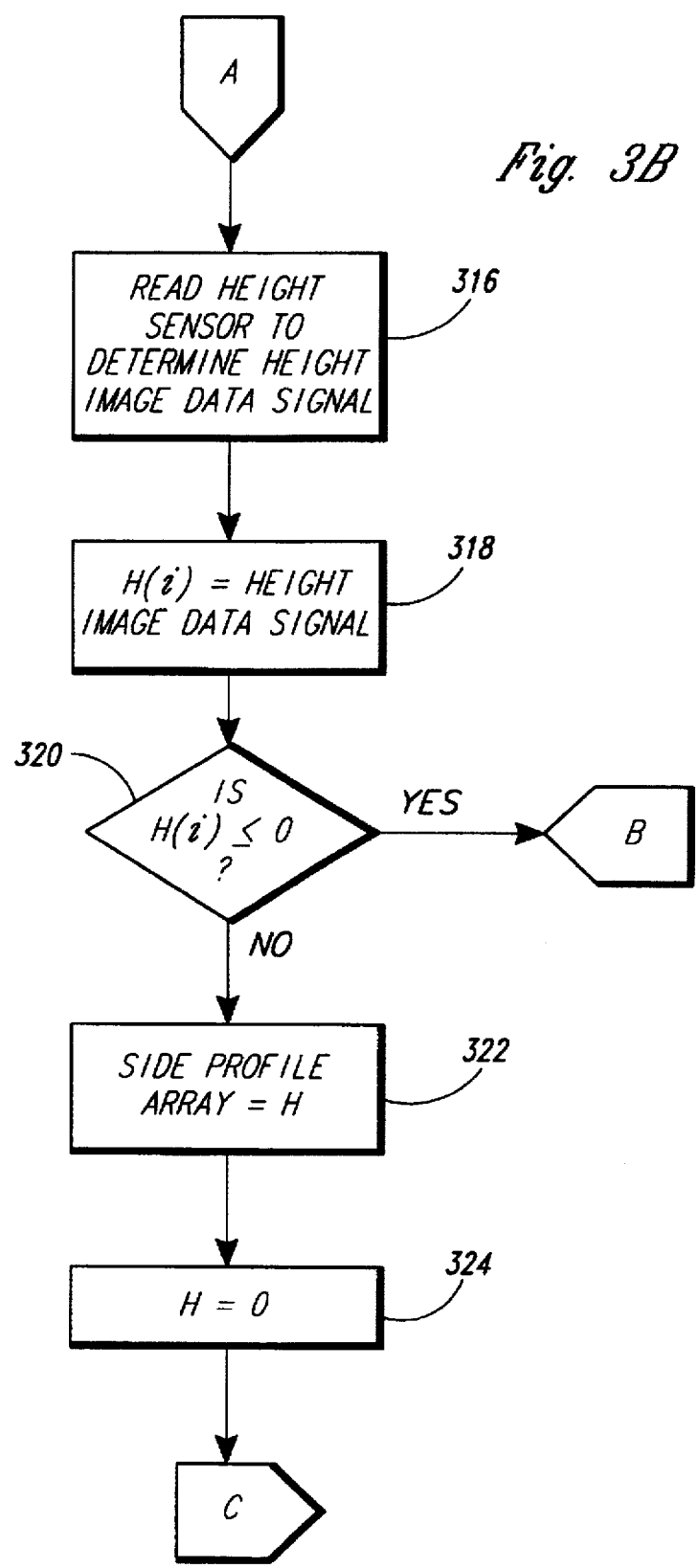

The method that is used by the data processor 208 to determine the height of the object 118 is generally illustrated in the decision flow diagram of FIGS. 3A and 3B. The data processor 208 begins the height sensing method at step 300 and initiates a counting variable at step 302. Thereafter, the data processor 208 delays for one sample period, step 304, and reads the sensor 204 associated with the height sensor 120, step 306, to receive the height image data signal which, as discussed above, comprises a plurality of measurement data signals from the plurality of charge coupled devices making up the sensor 204. The data processor 208 stores the height image data signal in an array H(i), step 308. The data processor then evaluates the stored data, step 310, to determine if the stored data is greater than zero. If not, the data processor determines that the object 118 has not yet reached the height sensor 120 and returns to repeat steps 304–310 until the value stored in the first element of the array, H(0), is greater than zero, step 310.

Thereafter, the counter is incremented by one, step 312, the data processor 208 delays for one sample period, step 314, and then reads the height sensor again to determine the next element in the height array, H(1), step 316 (FIG. 3B). The second element in the array is then set equal to the recently received height image data signal, step 318, and this stored value is evaluated to determine if it is greater than zero, step 320. If the most recently stored element of the array is greater than zero, then the data processor determines that the height of the object is still being sensed and repeats steps 312–320 until the last stored element is not greater than zero, step 320. It will be apparent that after the last stored element is not greater than zero, the height array H(i) will include a plurality of values wherein each element in the array is indicative of the height of a portion of the object 118. The plurality of values are therefore indicative of the profile of the object 118, step 322. The height profile can then be stored in the memory 216 and the process repeated for the next object, step 324.

Figure 4:
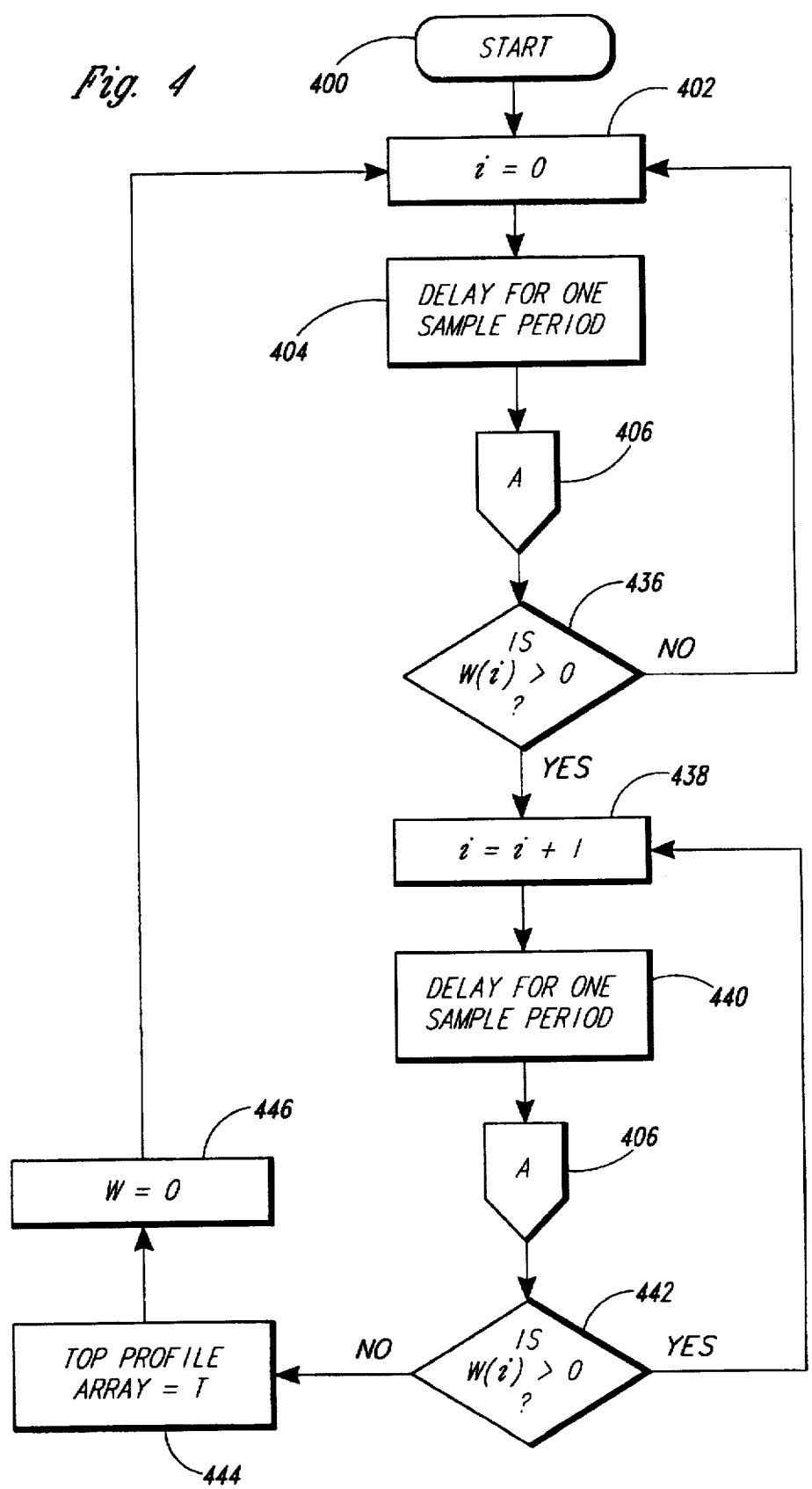
FIG. 4 is a decision flow diagram illustrating the method for determining the plan view image of an object in accordance with the method of the subject invention.
Figure 5A:
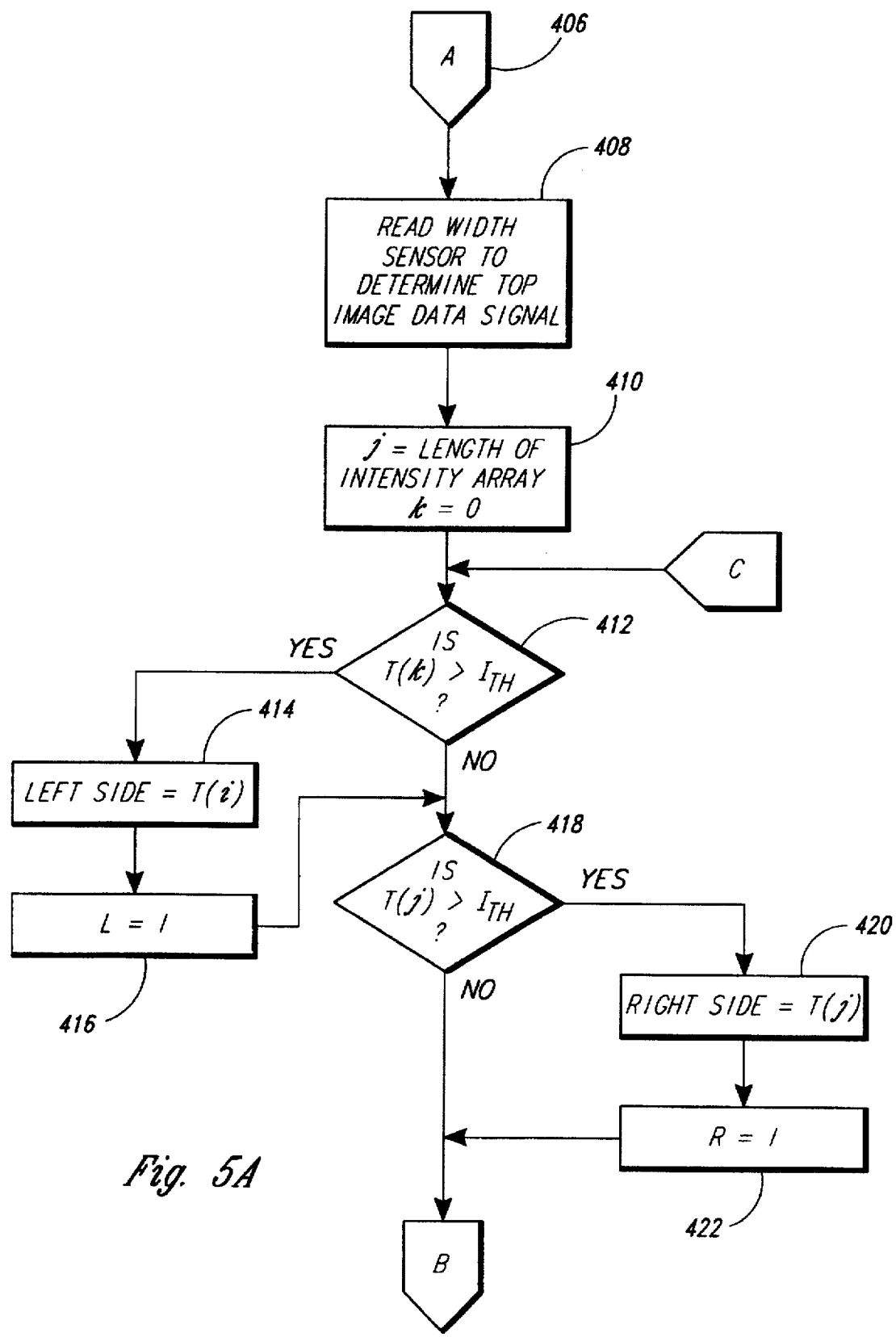
FIGS. 5A and 5B are decision flow diagrams illustrating the method for collecting plan view image data in accordance with the method of the subject invention.
Figure 5B:
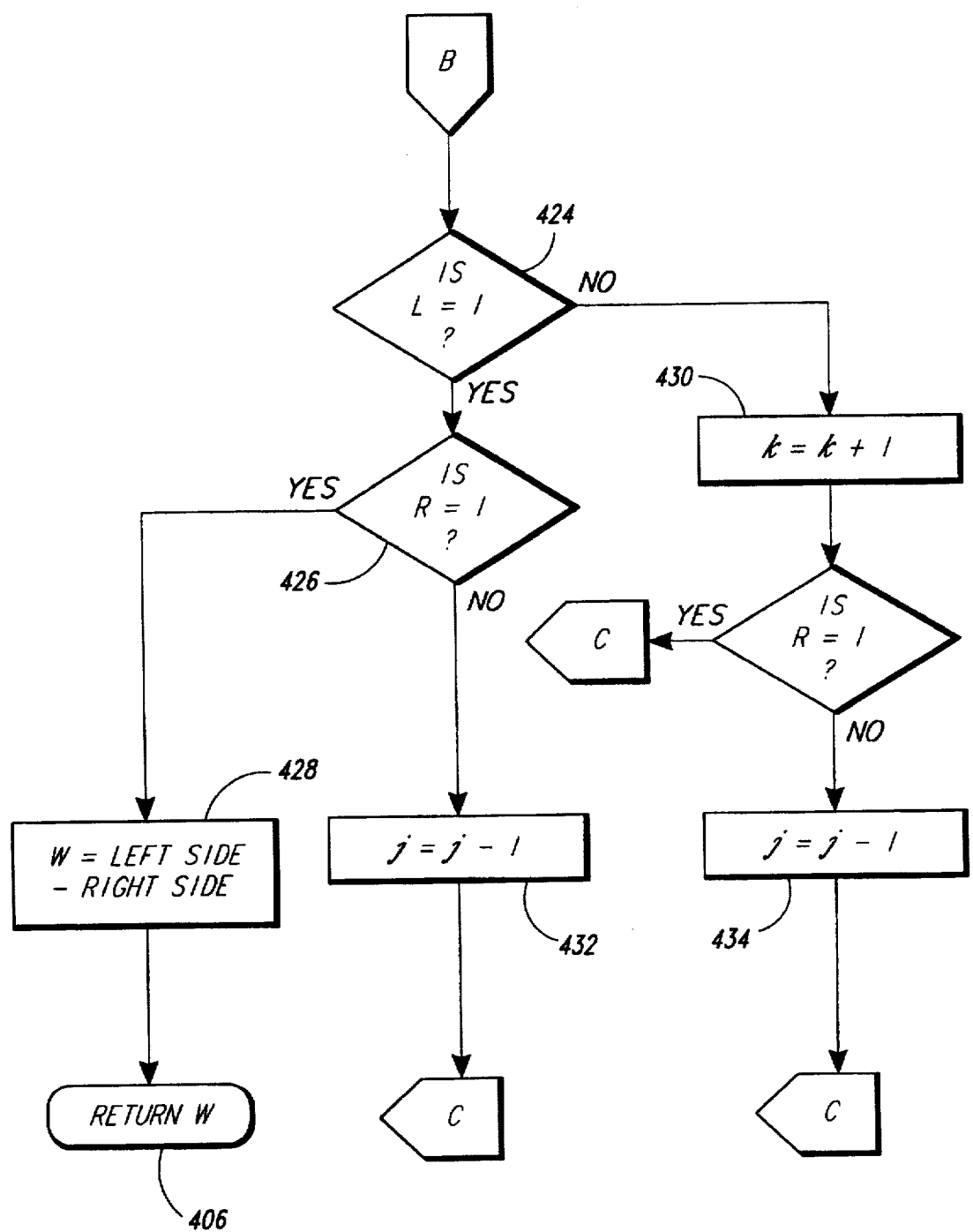

Simultaneous with the determination of the height of the object 118, the data processor 208 performs the method illustrated in FIG. 4 to determine the width profile of the object 218. The method of FIG. 4 is started at step 400 and includes initiation of a counter, step 402. The data processor 208 delays for one sample period, step 404, and performs the sub-method illustrated by step 405. The sub-method of step 405 is illustrated in FIGS. 5A and 5B and comprises the method by which the data processor 208 determines the value to be stored in the first element of the width profile array. The width profile array differs from the side profile array since the plurality of sensors 206 of the width sensor 122 will each receive light reflected from either the object 118 or the conveyor 102. The data processor 208 must therefore determine which light, if any, is reflected from the object 118 and store only these values in the first element of the width array. The sub-method illustrated in FIGS. 5A and 5B perform this function.

Referring to FIG. 5A, the data processor 208 first reads the sensor 122 to determine the top image data signal, step 408, and sets a variable equal to the length of the sensor army, step 410. The data processor 208 then compares the first measurement data signal T(0) of the top image data signal to a predetermined threshold $I_{th}$ to determine if it is greater and if so determines that the first data signal corresponding to the left side of the object is the first measurement data signal T(0), step 414, and indicates that the left side has been found by setting a flag L=1, step 416. Similarly, the data processor 208 compares the last measurement data signal T(j) to the predetermined threshold $I_{th}$ to determine if it is greater, step 418, and if so, determines that the last measurement data signal corresponds to the right side of the object, step 420, and sets a flag to indicate that the right side has been found, step 422. The predetermined threshold $I_{th}$ is selected at a level greater than the magnitude of light that will be detected for reflection from the top side 116 of the conveyor belt 114. Since the top of the object 118 is closer to the width sensor 122 than the top side 116 of the conveyor, light reflected from the object will result in a measurement data signal that is greater in magnitude than light reflected from the top side 116 of the conveyor. The threshold is selected at a level sufficient to distinguish light reflected from objects from light reflected from the conveyor.

After performing steps 412–422, the data processor checks to determine whether either the left side, step 424, or the right side, step 426, have been found and, if so, determines that the width is equal to the left side position minus the right side position, step 428. Thereafter, the width is returned to the width sensing algorithm of FIG. 4, step 406. Otherwise, the data processor 208 will increment the counter if the left side has not been found, step 430, and will decrement the counter if the right side has not been found, steps 432 and 434, and will return to repeat steps 412–422 until both the left side and the right side of the object are located.

In accordance with the present invention, only the width of the object, i.e., the left side minus the right side position are recorded in the width array W for determination of the volume. However, in a presently preferred embodiment of the invention, each of the measurement data signals is recorded in the memory 216 and can be used for determining the top side image of the object. This data can be valuable for reading mailing labels that may appear on the object thereby to provide information in addition to the volume of the object to the data processor 208.

Returning to FIG. 4, after returning from the sub-method of FIGS. 5A and 5B, the width variable is evaluated to determine if it is greater than zero, step 436, and if not, the data processor 208 determines that the object has not yet reached the width sensor 122. If so, the data processor increments the width variable, step 438, delays for one sample period, step 440, and returns to the sub-method of step 406 to determine the next width measurement. Thereafter, the data processor evaluates the next received width variable, step 442, to determine whether it is greater than zero and, if so, repeats steps 438–442 until the object moves beyond the width sensor 122 and hence the width variable returns to zero, step 444. Thereafter, the top profile array is stored in W(i) and the width array is reset to zero at step 446.

In order to determine the volume of the object, the data processor multiplies each element of the width array W with a corresponding element of the height array H to provide an incremental volume measurement. The plurality of incremental volume are then added to determine the complete volume of the object.

It will be apparent to those skilled in the art that, although only several presently preferred embodiments of the invention have been described in detail herein, many modifications and variations may be provided without departing from the true scope and spirit of the invention. Accordingly, the invention is not limited except as by the appended claims.

The invention claimed is:

1. Apparatus for determining a volume of an object comprising:

a conveyor having a conveyor frame wherein said conveyor frame is an elongated, substantially planar member having first and second edges and first and second ends, wherein said first edge is positioned opposite said second edge and said first and second edges are positioned intermediate said first and second ends, said conveyor including a conveyor belt movably supported upon said conveyor frame, said conveyor frame further including a topside and a bottomside wherein said conveyor belt extends around said conveyor frame covering a substantial portion of said topside and said bottomside, said topside of said conveyor being positioned and constructed to support said object, said conveyor further including motor means for rotating said conveyor belt around said conveyor frame so that said conveyor belt moves at a predetermined speed from said first end to said second end on said topside of said conveyor frame and from said second end to said first end on said bottom side of said conveyor frame;

a first light source positioned along said first edge of said conveyor for directing light generally toward said second edge of said conveyor;

a height sensor positioned along said second edge of said conveyor for determining a height profile of the object, said height sensor including a first plurality of light sensing devices organized in a linear array, said linear array extending upward from said topside of said conveyor and positioned to receive at least a portion of the light from said first light source that is transmitted past the object, each of said first plurality of light sensing devices being responsive to a sample signal for providing a first data signal having a value indicative of a magnitude of light received;

a second light source displaced from said topside of said conveyor and positioned for directing light generally toward said topside of said conveyor, said second light source being positioned so that at least a portion of the light directed toward said topside of said conveyor is reflected from the object;

a width sensor displaced from said topside of said conveyor for determining a two-dimensional image of the object depicting a width and a length of the object as well as additional image information from the object, said width sensor including a second plurality of light sensing devices organized in a linear array, said linear array detecting the object at any position located from said first edge to said second edge of said conveyor and positioned to receive at least a portion of the light reflected from the object, each of said second plurality of light sensing devices being responsive to the sample signal for providing a second data signal having a value indicative of the magnitude of light sensed, said additional image information in said two-dimensional image of the object including image information of a machine-readable symbol positioned on an upper surface of the object; and data processing means including an image memory and coupled to receive said first and second data signals from said plurality of first and second light sensing devices, said data processing means being constructed to provide the sample signal at predetermined intervals and to receive first and second data signals for each sample signal provided and store at least the second data signals in the image memory, said data processing means being responsive to said first data signals received at each interval for determining an incremental height of the object when moving along said conveyor, said data processing means being further constructed for processing said second data signals stored in the image memory to distinguish light reflected from the object from light reflected from said topside of said conveyor and for determining an incremental width of the object when moving along said conveyor, said data processing means being further constructed to combine the incremental heights and widths determined over a plurality of intervals to determine the volume of the object and construct a substantially entire top image of the object from the incremental widths in the image memory, and determine the two-dimensional image, including the image information of the machine-readable symbol.

2. Apparatus for determining a volume of an object comprising:

a conveyor that supports and moves the object from a first position to a second position, said conveyor having first and second edges positioned in opposing relation intermediate said first and second positions thereby to define a two dimensional surface;

a height sensor positioned along said first and second edges of said conveyor that determines a height profile of the object, said height sensor including a first plurality of light sensing devices organized in a linear array, said linear array extending upward from said two dimensional surface so that said first plurality of light sensing devices sense light radiating generally from a direction of said second edge of said conveyor, each of said first plurality of light sensing devices being responsive to a sample signal for providing a first data signal having a value indicative of a magnitude of light sensed;

a width sensor displaced from said two dimensional surface for determining a two-dimensional image of the object depicting a width and a length of a side of the object as well as additional image information from the object, said width sensor including a second plurality of light sensing devices organized in a linear array, said linear array detecting the object at any position located from said first edge to said second edge of said conveyor and said linear array being positioned so that each of said plurality of light sensing devices sense at least a portion of light reflected from the object, each of said second plurality of light sensing devices being responsive to the sample signal for providing a second data signal having a value indicative of the magnitude of light sensed, said additional image information in said two-dimensional image of the object including image information of a machine-readable symbol positioned on an upper surface of the object; and a single data processing device coupled to receive said first and second data signals from said plurality of first and second light sensing devices, said data processing device having a memory that stores the sampled second data signal as a substantially complete image of the side of the object and being constructed to provide a sample signal at predetermined intervals and to receive first and second data signals for each sample signal provided, said data processing device being responsive to said first and second data signals received at each interval for determining the volume of the object, and read the machine-readable symbol.

3. The apparatus as recited in claim 2 wherein said height sensor further includes:

a light source positioned along said first edge of said conveyor that directs light toward said second edge of said conveyor so that at least a portion of the light is transmitted past the object; and light detector that detects at least a portion of the light transmitted past the object.

4. The apparatus as recited in claim 2 wherein said width sensor further includes:

a light source displaced from said two dimensional surface on which the object is supported and positioned for reflecting light from the object; and light detector that detects at least a portion of the light reflected from the object.

5. The apparatus as recited in claim 4 wherein said data processing device further comprises a filter responsive to said light detector that distinguishes light reflected from the object from light reflected from said two dimensional surface.

6. Apparatus for determining a volume of an object comprising:

a first image sensor that provides first image data indicative of a two-dimensional image of a first surface of the object as viewed from a first direction;

a second image sensor that provides second image data indicative of an image of a second surface of the object as viewed from a second direction;

an image memory for storing at least the first image data of the first surface; and a data processing device coupled to the image memory and responsive to the first and second image data for determining the volume of the object wherein said data processing device utilizes the two-dimensional image to acquire additional image information from the object including acquiring image information of a machine-readable symbol positioned on the first surface of the object.

7. The apparatus of claim 6 wherein the memory stores a plurality of samples of the first image data, and wherein the data processing device retrieves and combines the plurality of samples of the first image data to form the two-dimensional image of the first surface of the object, including the image information of the machine-readable symbol.

8. The apparatus as recited in claim 6 wherein said first sensor comprises a light sensor that provides the first image data, said light sensor being constructed to receive at least a portion of light reflected from the object.

9. The apparatus as recited in claim 8 wherein said light sensor is responsive to a sample signal to provide a plurality of measurement data signals indicative of a magnitude of light reflected from a field of view wherein the field of view is a line displaced from said light sensing means in a view direction, wherein the plurality of measurement data signals combined are the first image data, said apparatus further comprising a displacement device that moves the object relative to said light sensor so that a plurality of portions of the object are positioned in the field of view, said light sensor being further constructed to determine the magnitude of light radiating from the field of view as the object is being displaced relative to said light sensor thereby to provide the plurality of measurement data signals.

10. The apparatus as recited in claim 8 wherein said light sensor is responsive to a sample signal to provide a measurement data signal indicative of a magnitude of light reflected from a field of view wherein the field of view is a line displaced from said light sensor in a view direction, said apparatus further comprising:

a displacement device that moves the object relative to said light sensor so that a plurality of portions of the object are positioned in the field of view, said data processing device being constructed to provide the sample signal in a repetitive fashion as the plurality of portions of the object are positioned in the field of view to receive a plurality of measurement data signals, said data processing device being responsive to the plurality of measurement data signals received from said light sensor in response to each sample signal to determine the image of the object.

11. The apparatus as recited in claim 10 wherein said data processing device further comprises filter means for distinguishing light reflected from the object from other light received by said light sensor.

12. The apparatus of claim 6 wherein the data processing device employs a single data processor.

13. A method for determining a volume of an object comprising the steps of:

reflecting a first light from the object in a first direction and transmitting a second light in a second direction generally orthogonal to the first direction of the first light reflected;

providing first and second data signals indicative of the light received from the first and second directions, respectively;

filtering the first data signals to distinguish light reflected from the object from other light received and providing first filtered data signals indicative of a two-dimensional image of the object;

obtaining and storing image information from the object using the first filtered data signals, the additional image information obtained from the object including image information of a first side of the object and of a machine-readable symbol positioned on the object; and combining the first filtered data signals with the second data signals to provide the volume of the object.

14. The method as recited in claim 13 wherein said step of filtering the first data signals to distinguish light reflected from the object from other light received and providing first filtered data signals indicative of the light reflected from the object comprises the substep of comparing each first data signal to a predetermined threshold value and, if the first data signal is greater than the predetermined threshold value identifying the first data signal as a first filtered data signal.

15. The method as recited in claim 13 wherein said step of combining the first filtered data signals with the second data signals to provide the volume of the object comprises the substeps of:

combining respective ones of the first filtered data signals with the second data signals to provide a plurality of incremental volumes each representing a volume of an incremental portion of the object; and combining the plurality of incremental volumes to provide the volume of the object.

16. The method as recited in claim 13 wherein the object has first and second surfaces, said step of reflecting light from the object in first and second generally orthogonal directions and receiving at least a portion of the light reflected comprising the substeps of:

directing a beam of light toward the object to illuminate a portion of the object so that at least a portion of the beam of light is reflected from the object and receiving at least a portion of the beam of light that is reflected; and displacing the object with respect to the illuminating beam to reflect at least a portion of the beam of light from substantially all of the first surface of the object.

17. A method for determining a volume of an object wherein the object includes first and second surfaces, said method comprising the steps of:

directing first and second beams of light toward the object in first and second generally orthogonal directions to illuminate respective portions of the first and second surfaces of the object so that at least a portion of the beam of light is reflected from the object and receiving at least a portion of the first beam of light that was reflected and the second beam of light;

displacing the object with respect to the first and second beams of light to reflect at least a portion of the first beam of light from substantially all of the first surface of the object;

providing a plurality of first and second data signals indicative of the light received from the first and second directions, respectively, wherein each said first and second data signal is indicative of at least a portion of the first and second surfaces of the object, respectively;

comparing each first data signal to a predetermined threshold value to distinguish light reflected from the object from other light received, if the first data signal is greater than the predetermined threshold value, then identifying the first data signal as a first filtered data signal and providing first filtered data signals indicative of a two-dimensional image of the object;

storing a plurality of samples of the first filtered data signals;

using a portion of the plurality of first filtered data signals to acquire additional information regarding the object by combining a portion of the plurality of samples, the additional information including image information of a first side of the object and of a machine-readable symbol positioned on the first surface of the object;

combining respective ones of the first filtered data signals with the second data signals to provide a plurality of incremental volumes each representing the volume of an incremental portion of the object; and combining the plurality of incremental volumes to provide the volume of the object.

18. Apparatus for determining information about an object comprising:

a first optical sensor that provides first image data indicative of a two-dimensional image of a first surface of the object as viewed from a first direction;

a second optical sensor that provides second image data indicative of an image of a second surface of the object as viewed from a second direction;

an image memory for storing at least the first image data of the first surface; and a single data processing device coupled to the image memory and responsive to the first and second image data for determining the volume of the object and wherein said data processing device utilizes the two-dimensional image to acquire additional image information from the object including image information of a label positioned on the first surface of the object and read the image information of the label.

19. Apparatus for determining a volume of an object comprising:

a first sensor that provides first image data indicative of a two-dimensional image of a first surface of the object as viewed from a first direction;

a second sensor that provides second image data indicative of an image of a second surface of the object as viewed from a second direction;

an image memory for storing at least the first image data of the first surface; and a data processor coupled to the image memory and responsive to the first and second image data for determining the volume of the object, and wherein said data processor utilizes the two-dimensional image to acquire additional image information from the object including acquiring image information of a bar code positioned on the first surface of the object.

* * * * *